(12) United States Patent
Tanaka

(10) Patent No.: US 11,277,077 B2
(45) Date of Patent: Mar. 15, 2022

(54) POWER CONVERSION DEVICE SUPPRESSING WAVEFORM DISTORTION IN AN OUTPUT VOLTAGE

(71) Applicant: TOSHIBA MITSUBISHI-ELECTRIC INDUSTRIAL SYSTEMS CORPORATION, Chuo-ku (JP)

(72) Inventor: Tomohiro Tanaka, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/771,007

(22) PCT Filed: Oct. 30, 2018

(86) PCT No.: PCT/JP2018/040219
§ 371 (c)(1),
(2) Date: Jun. 9, 2020

(87) PCT Pub. No.: WO2020/089990
PCT Pub. Date: May 7, 2020

(65) Prior Publication Data
US 2020/0373854 A1    Nov. 26, 2020

(51) Int. Cl.
*H02M 7/5387*    (2007.01)
*H02M 1/12*    (2006.01)
(Continued)

(52) U.S. Cl.
CPC ......... *H02M 7/53871* (2013.01); *H02M 1/12* (2013.01); *H02M 7/5395* (2013.01); *H02M 7/48* (2013.01)

(58) Field of Classification Search
CPC ............ H02M 1/12; H02M 1/14; H02M 1/42; H02M 7/483; H02M 2001/0048;
(Continued)

(56) References Cited

U.S. PATENT DOCUMENTS 5,706,186 A * 1/1998 Blasko .............. H02M 7/53875
363/41
5,736,825 A * 4/1998 Kaura .................... G05B 11/28
318/599
(Continued)

FOREIGN PATENT DOCUMENTS

| JP | 9-149660 A | 6/1997 |
| JP | 2006-101621 A | 4/2006 |
| KR | 1998-025522 A | 7/1998 |

OTHER PUBLICATIONS

International Search Report dated Dec. 4, 2018 in PCT/JP2018/040219 filed on Oct. 30, 2018.
(Continued)

*Primary Examiner* — Yusef A Ahmed
(74) *Attorney, Agent, or Firm* — Oblon, McClelland, Maier & Neustadt, L.L.P.

(57) ABSTRACT

A power conversion device includes: a three-phase inverter including a plurality of switching elements; and a controller configured to PWM-control the three-phase inverter based on three phase voltage commands. The controller generates a zero-phase voltage command using a two-phase modulation scheme and a third harmonic component of the three phase voltage commands. The controller adds the generated zero-phase voltage command to each of the three phase voltage commands to thereby correct each of the three phase voltage commands. The controller compares each of the corrected three phase voltage commands with a carrier wave, to thereby generate a control signal for controlling switching of the plurality of switching elements.

4 Claims, 10 Drawing Sheets

(51) Int. Cl.
*H02M 7/5395* (2006.01)
*H02M 7/48* (2007.01)

(58) Field of Classification Search
CPC ..... H02M 7/5395; H02M 2007/53876; H02M 7/53876
See application file for complete search history.

(56) References Cited

U.S. PATENT DOCUMENTS

| | | | | |
|---|---|---|---|---|
| 5,757,099 A * | 5/1998 | Cheng | ........................ | H02J 3/01 307/105 |
| 5,811,949 A * | 9/1998 | Garces | .............. | H02M 7/53875 318/448 |
| 6,023,417 A * | 2/2000 | Hava | ................. | H02M 7/53875 363/41 |
| 9,712,084 B2 * | 7/2017 | Kikuchi | ............. | H02M 7/53871 |
| 9,948,223 B2 * | 4/2018 | Ishida | ..................... | H02P 21/10 |
| 2001/0015904 A1 * | 8/2001 | Kimura | ................. | H02M 7/538 363/131 |
| 2003/0030404 A1 * | 2/2003 | Iwaji | ......................... | H02P 6/18 318/700 |
| 2006/0215429 A1 * | 9/2006 | Oka | ......................... | H02P 21/22 363/97 |
| 2009/0167224 A1 * | 7/2009 | Miura | .................... | B62D 5/046 318/400.23 |
| 2009/0322264 A1 * | 12/2009 | Imura | ................. | H02P 21/0089 318/400.09 |
| 2010/0039056 A1 * | 2/2010 | Kobayashi | .............. | H02P 27/08 318/400.35 |
| 2011/0156632 A1 * | 6/2011 | Cheng | .................... | H02P 27/08 318/808 |
| 2011/0187308 A1 * | 8/2011 | Suhama | .................... | H02P 6/08 318/798 |
| 2011/0273125 A1 * | 11/2011 | Yamada | .................. | H02P 21/22 318/503 |
| 2012/0056569 A1 * | 3/2012 | Takamatsu | .............. | B60L 15/08 318/400.26 |
| 2012/0118662 A1 * | 5/2012 | Sakai | ........................ | H02P 6/28 180/443 |
| 2012/0194109 A1 * | 8/2012 | Uryu | ....................... | B62D 5/046 318/400.15 |
| 2012/0206075 A1 * | 8/2012 | Kimpara | ................. | H02P 21/04 318/400.15 |
| 2013/0264974 A1 * | 10/2013 | Suzuki | ................ | H02M 7/5395 318/139 |
| 2013/0328398 A1 * | 12/2013 | Kanao | .................... | H02J 3/1814 307/23 |
| 2015/0016155 A1 * | 1/2015 | Lee | ......................... | H02M 1/12 363/44 |
| 2015/0054432 A1 * | 2/2015 | Omata | .................... | H02P 21/14 318/400.02 |
| 2016/0190971 A1 * | 6/2016 | Yamakawa | ............. | H02P 27/08 318/504 |
| 2016/0226408 A1 * | 8/2016 | Yamakawa | ................ | H02P 6/10 |
| 2018/0159458 A1 * | 6/2018 | Shouji | ..................... | H02P 21/18 |
| 2019/0044427 A1 * | 2/2019 | Fujii | ..................... | H02M 7/483 |
| 2019/0089286 A1 * | 3/2019 | Toba | .................. | H02M 7/5395 |
| 2019/0097559 A1 * | 3/2019 | Li | ......................... | F25B 49/025 |
| 2019/0229646 A1 * | 7/2019 | Liu | ..................... | H02M 7/5395 |
| 2019/0253014 A1 * | 8/2019 | Iwaji | ....................... | H02P 27/08 |
| 2019/0334469 A1 * | 10/2019 | Hara | ....................... | H02P 27/08 |
| 2019/0367080 A1 * | 12/2019 | Yamanaka | .............. | H02M 1/08 |
| 2019/0375449 A1 * | 12/2019 | Takase | ..................... | H02P 21/06 |
| 2019/0393824 A1 * | 12/2019 | Osugi | ..................... | H02P 29/024 |
| 2020/0119678 A1 * | 4/2020 | Hoshino | .................. | H02P 21/18 |
| 2020/0153375 A1 * | 5/2020 | Mori | .................. | H02M 7/53875 |
| 2020/0204057 A1 * | 6/2020 | Kato | ...................... | H02M 1/126 |
| 2020/0382021 A1 * | 12/2020 | Yamane | .............. | H02M 7/5395 |
| 2021/0044243 A1 * | 2/2021 | Hara | ....................... | H02P 27/08 |

OTHER PUBLICATIONS

Notification of Reason for Refusal dated Sep. 7, 2021 in Korean Patent Application No. 10-2020-7019104 (with English machine translation), 7 pages.

* cited by examiner

FIG.7
(A)  −K=−0.3
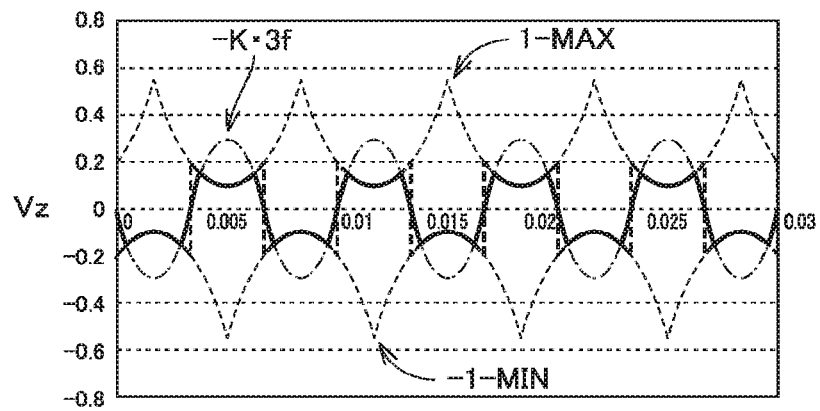
(B)
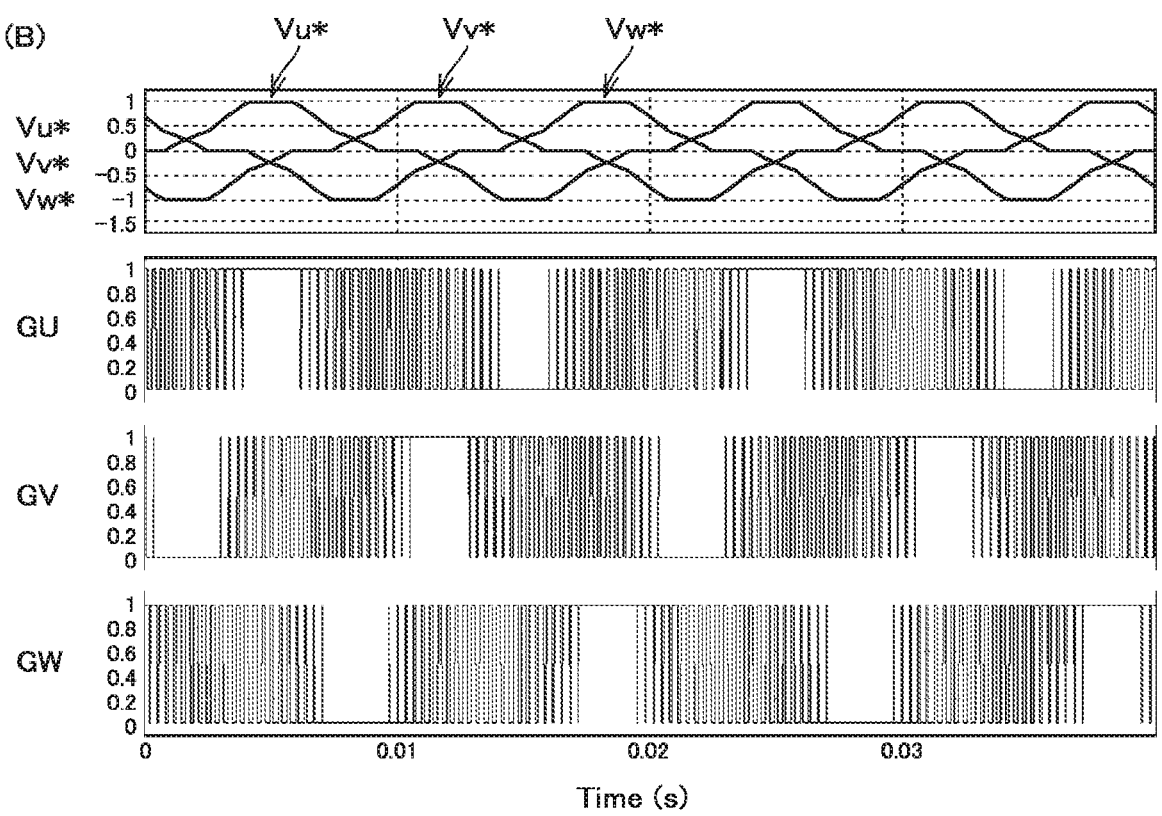

FIG.9
(A)  −K=−0.15
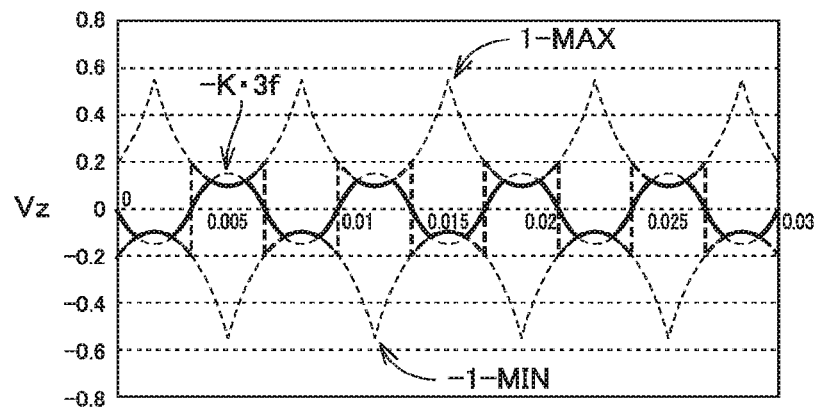
(B)
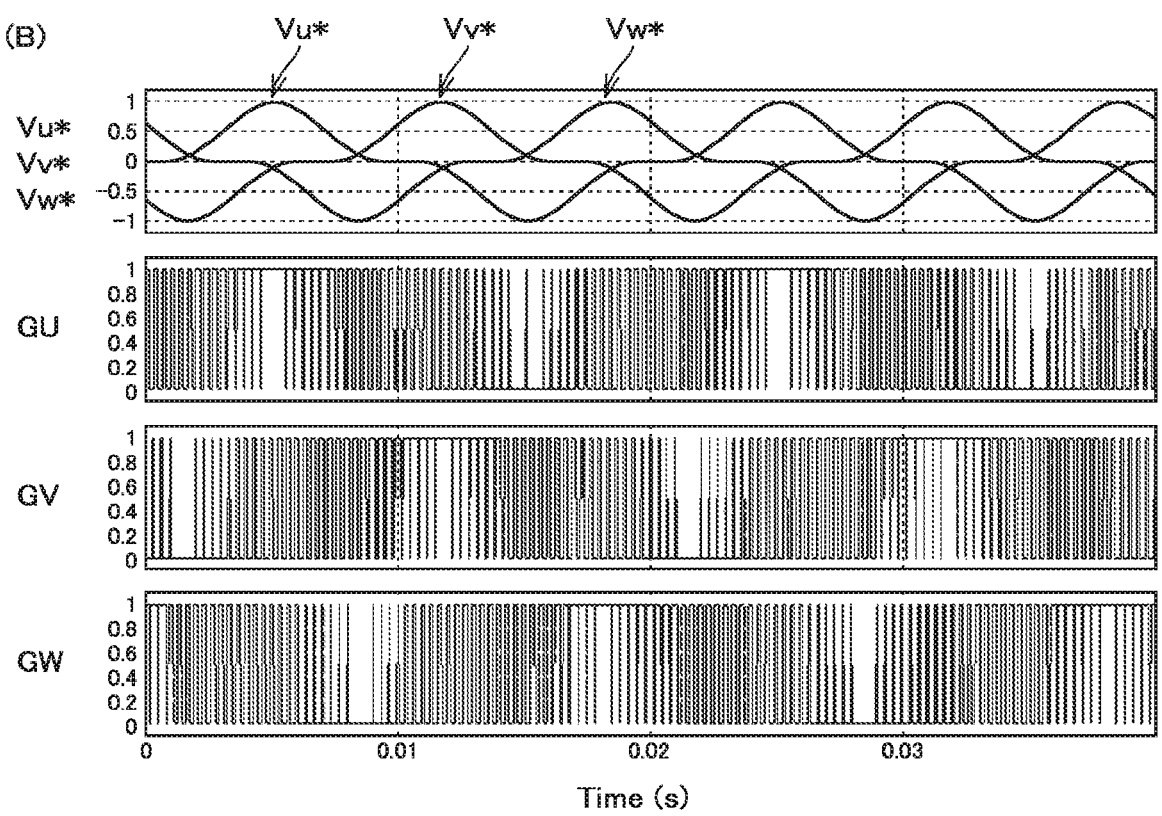

FIG.10
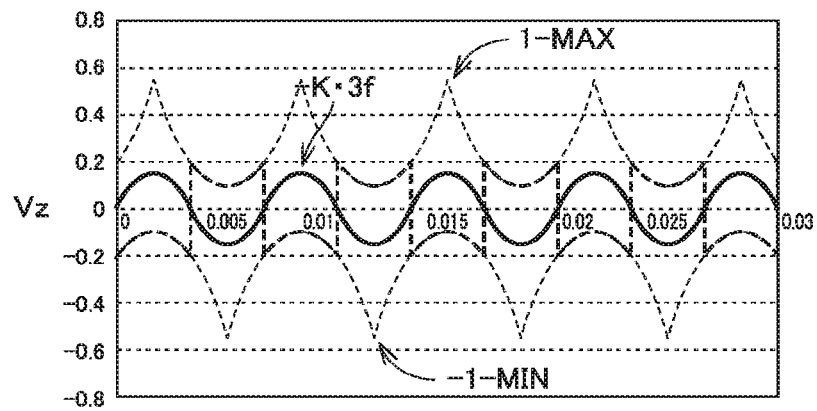
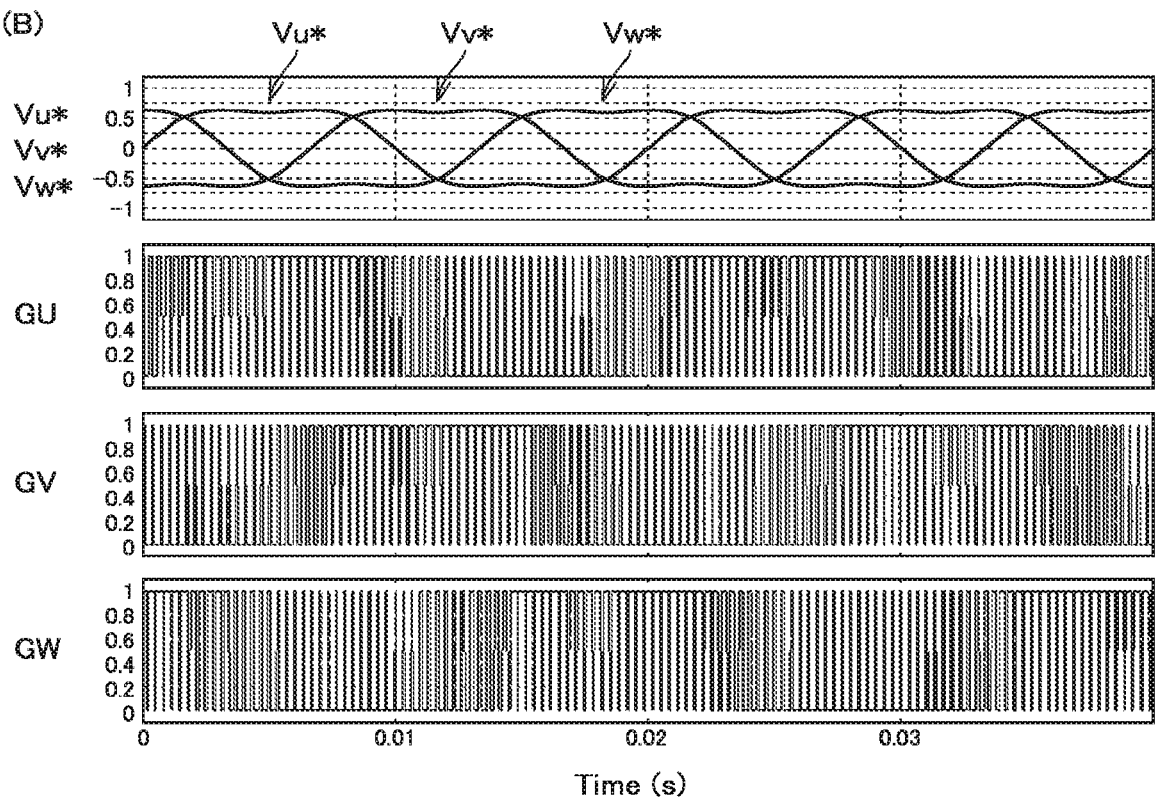

POWER CONVERSION DEVICE SUPPRESSING WAVEFORM DISTORTION IN AN OUTPUT VOLTAGE

TECHNICAL FIELD

The present invention relates to a power conversion device.

BACKGROUND ART

Pulse width modulation (PWM) control is widely applied as a control configuration for a three-phase inverter that performs power conversion between direct-current (DC) power and three-phase alternating-current (AC) power (for example, see Japanese Patent Laying-Open No. 09-149660 (PTL 1)). There is a sinusoidal wave comparison scheme as general PWM control. In the sinusoidal wave comparison scheme, switching elements in each phase are controlled to be on and off in accordance with the voltage comparison between a sinusoidal voltage command and a carrier wave (representatively, a triangular wave).

In the sinusoidal wave comparison scheme, switching elements in each phase are turned on and off at all times. In PTL 1, by applying a two-phase modulation scheme in which only the switching elements in two phases among three phases are turned on and off, the number of times of switching the switching elements in each phase is reduced. Thereby, the switching loss in a three-phase inverter can be reduced.

CITATION LIST

Patent Literature

[PTL 1] Japanese Patent Laying-Open No. 09-149660

SUMMARY OF INVENTION

Technical Problem

In the two-phase modulation scheme, among the sinusoidal voltage commands of respective phases, the voltage command of a phase having a maximum amplitude is caused to coincide with the amplitude of the carrier wave, and the voltage commands of other two phases are corrected. Thereby, no influence can be exerted upon each output line to line voltage in a three-phase inverter.

However, the voltage commands of respective phases after correction become discontinuous when the phase in which no switching occurs is switched. This causes distortion in the voltage waveform that is output from the three-phase inverter. This waveform distortion may increase the harmonic component contained in the output voltage from the three-phase inverter and also may increase the zero-phase current.

The present invention has been made to solve the above-described problems. An object of the present invention is to provide a power conversion device that is capable of suppressing waveform distortion in an output voltage from a three-phase inverter occurring when the two-phase modulation scheme is applied.

Solution to Problem

According to an aspect of the present invention, a power conversion device configured to perform power conversion between DC power and three-phase AC power is provided. The power conversion device includes: a three-phase inverter having a plurality of switching elements; and a controller configured to PWM-control the three-phase inverter based on three phase voltage commands. The controller is configured to generate a zero-phase voltage command using a two-phase modulation scheme and a third harmonic component of the three phase voltage commands. The controller is configured to add the generated zero-phase voltage command to each of the three phase voltage commands to correct each of the three phase voltage commands. The controller is configured to compare each of the corrected three phase voltage commands with a carrier wave to generate a control signal for controlling switching of the plurality of switching elements.

Advantageous Effects of Invention

According to the present invention, a power conversion device can be provided, which is capable of suppressing waveform distortion in an output voltage from a three-phase inverter when a two-phase modulation scheme is applied.

BRIEF DESCRIPTION OF DRAWINGS

FIG. 7 shows signal waveform diagrams on the condition that −K=−0.3 in the two-phase modulation correction unit according to the present embodiment.

FIG. 9 shows signal waveform diagrams on the condition that −K=−0.15 in the two-phase modulation correction unit according to the present embodiment.

FIG. 10 shows signal waveform diagrams on the condition that −K=+0.15 in the two-phase modulation correction unit according to the present embodiment.

DESCRIPTION OF EMBODIMENTS

Figure 1:
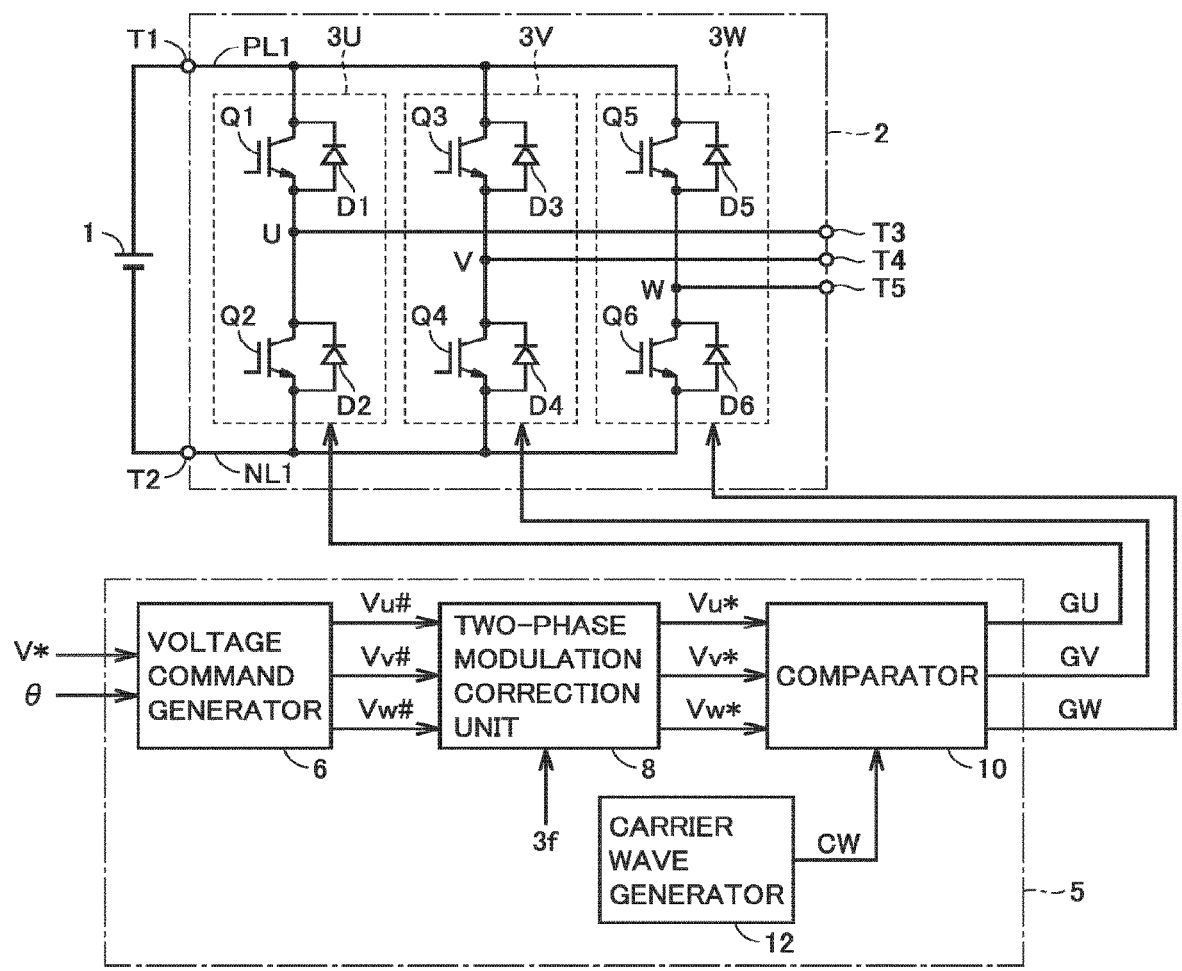
FIG. 1 is a main circuit configuration diagram of a power conversion device according to an embodiment of the present invention.

The embodiments of the present invention will be hereinafter described in detail with reference to the accompanying drawings, in which the same or corresponding components are designated by the same reference characters, and the description thereof will not be basically repeated.

FIG. 1 is a main circuit configuration diagram of a power conversion device according to an embodiment of the present invention. The power conversion device according to the present embodiment is configured to perform power conversion between DC power and three-phase AC power (U-phase power, V-phase power, and W-phase power).

Referring to FIG. 1, the power conversion device according to the present embodiment includes DC terminals T1, T2, AC terminals T3, T4 and T5, a three-phase inverter 2, and a controller 5.

DC terminal T1 (a high-potential-side DC terminal) is electrically connected to a positive electrode terminal of a DC power supply 1. DC terminal T2 (a low-potential-side DC terminal) is electrically connected to a negative electrode terminal of DC power supply 1. A DC positive bus PL1 is connected to DC terminal T1 while a DC negative bus NL1 is connected to DC terminal T2. A load (not shown) is connected to each of AC terminals T3 to T5. The term "electrically connected" used herein indicates the connection state in which electrical energy can be transmitted via direct connection or via connection through other elements. AC terminal T3 is a U-phase terminal, AC terminal T4 is a V-phase terminal, and AC terminal T5 is a W-phase terminal.

Three-phase inverter 2 converts the DC power, which is supplied from DC power supply 1, into three-phase AC power. The three-phase AC power is supplied to a load (not shown) through each of AC terminals T3, T4, and T5. Three-phase inverter 2 includes power semiconductor switching elements (each of which will be hereinafter also simply referred to as a "switching element") Q1 to Q6.

Switching element Q1 is electrically connected between DC positive bus PL1 (that is, DC terminal T1) and a node U. Switching element Q2 is electrically connected between node U and DC negative bus NL1 (that is, DC terminal T2). Node U is electrically connected to AC terminal T3 (a U-phase terminal). Switching elements Q1 and Q2 constitute a U-phase arm 3U.

Switching element Q3 is electrically connected between DC positive bus PL1 and a node V. Switching element Q4 is electrically connected between node V and DC negative bus NL1. Node V is electrically connected to AC terminal T4 (a V-phase terminal). Switching elements Q3 and Q4 constitute a V-phase arm 3V.

Switching element Q5 is electrically connected between DC positive bus PL1 and a node W. Switching element Q6 is electrically connected between node W and DC negative bus NL1. Node W is electrically connected to AC terminal T5 (a W-phase terminal). Switching elements Q5 and Q6 constitute a W-phase arm 3W. U-phase arm 3U, V-phase arm 3V and W-phase arm 3W are connected in parallel with each other between DC positive bus PL1 and DC negative bus NL1.

In FIG. 1, an insulated gate bipolar transistor (IGBT) is used as a switching element, but an optional self-arc-extinguishing type switching element such as a metal oxide semiconductor field effect transistor (MOSFET) can also be used. Diodes D1, D2, D3, D4, D5, and D6 are connected in anti-parallel with switching elements Q1, Q2, Q3, Q4, Q5, and Q6, respectively. Each of diodes D1 to D6 is provided in order to cause a free-wheel current to flow while a corresponding one of the switching elements is off. When a switching element is a MOSFET, a free-wheel diode is formed of a parasitic diode (a body diode). When a switching element is an IGBT not incorporating a diode, a free-wheel diode is formed of a diode connected in anti-parallel with the IGBT.

Controller 5 controls conduction (ON) and non-conduction (OFF) of the switching elements in each of U-phase arm 3U, V-phase arm 3V, and W-phase arm 3W. Specifically, controller 5 generates: a control signal GU for controlling switching elements Q1 and Q2 in U-phase arm 3U to be turned on or off; a control signal GV for controlling switching elements Q3 and Q4 in V-phase arm 3V to be turned on or off; and a control signal GW for controlling switching elements Q5 and Q6 in W-phase arm 3W to be turned on or off.

Controller 5 generates control signals GU, GV and GW by utilizing a PWM control scheme. The PWM control scheme is a control scheme in which a pulse width of the square wave output voltage is changed in each control cycle, thereby changing the average value of the output voltages in the cycle period. The PWM control scheme includes: a "sinusoidal wave comparison scheme" in which the switching elements in three phases are continuously operated to be on and off based on comparison of the sinusoidal voltage command of each phase with a carrier wave having a uniform frequency; and a "two-phase modulation scheme" in which only the switching elements in two phases of three phases are operated to be on and off. The two-phase modulation scheme is applied in the present embodiment.

Specifically, controller 5 includes a voltage command generator 6, a two-phase modulation correction unit 8, a comparator 10, and a carrier wave generator 12. Voltage command generator 6 generates three phase voltage commands (a U-phase voltage command Vu #, a V-phase voltage command Vv #, and a W-phase voltage command Vw #). Each of voltage commands Vu #, Vv #, and Vw # of respective phases changes in a sinusoidal shape, and has an amplitude smaller than the amplitude of the carrier wave.

Two-phase modulation correction unit 8 corrects three phase voltage commands Vu #, Vv #, and Vw # generated by voltage command generator 6, to thereby generate three phase voltage commands (a U-phase voltage command Vu*, a V-phase voltage command Vv*, and a W-phase voltage command Vw*). There is a time period in which the amplitude of each of voltage commands Vu*, Vv*, and Vw* of respective phases coincides with the amplitude of a carrier wave CW. This time period is provided for a voltage command of the phase having a maximum amplitude among voltage commands Vu #, Vv # and Vw # of respective phases.

Carrier wave generator 12 generates a triangular wave signal as carrier wave CW. Carrier wave CW is a signal that has a frequency equal to an integral multiple of the three phase voltage commands (U-phase voltage command Vu #, V-phase voltage command Vv #, and W-phase voltage command Vw #) and that is in synchronization with the three phase voltage commands.

Comparator 10 compares each of three phase voltage commands Vu*, Vv* and Vw* with carrier wave CW. Control signals GU, GV, and GW are generated such that two switching elements in each of the phases are turned on and off at the timing when a corresponding one of voltage commands Vu*, Vv* and Vw* of respective phases coincides with the amplitude of carrier wave CW. In addition, in order to avoid a power supply short circuit, two switching elements in each phase are controlled such that one switching element is turned on while the other switching element is turned off.

Then, the configuration of two-phase modulation correction unit 8 shown in FIG. 1 will be described. First, an explanation will be given with regard to a configuration example of a two-phase modulation correction unit 8A, as a comparative example, to which a general two-phase modulation scheme is applied.

Figure 2:
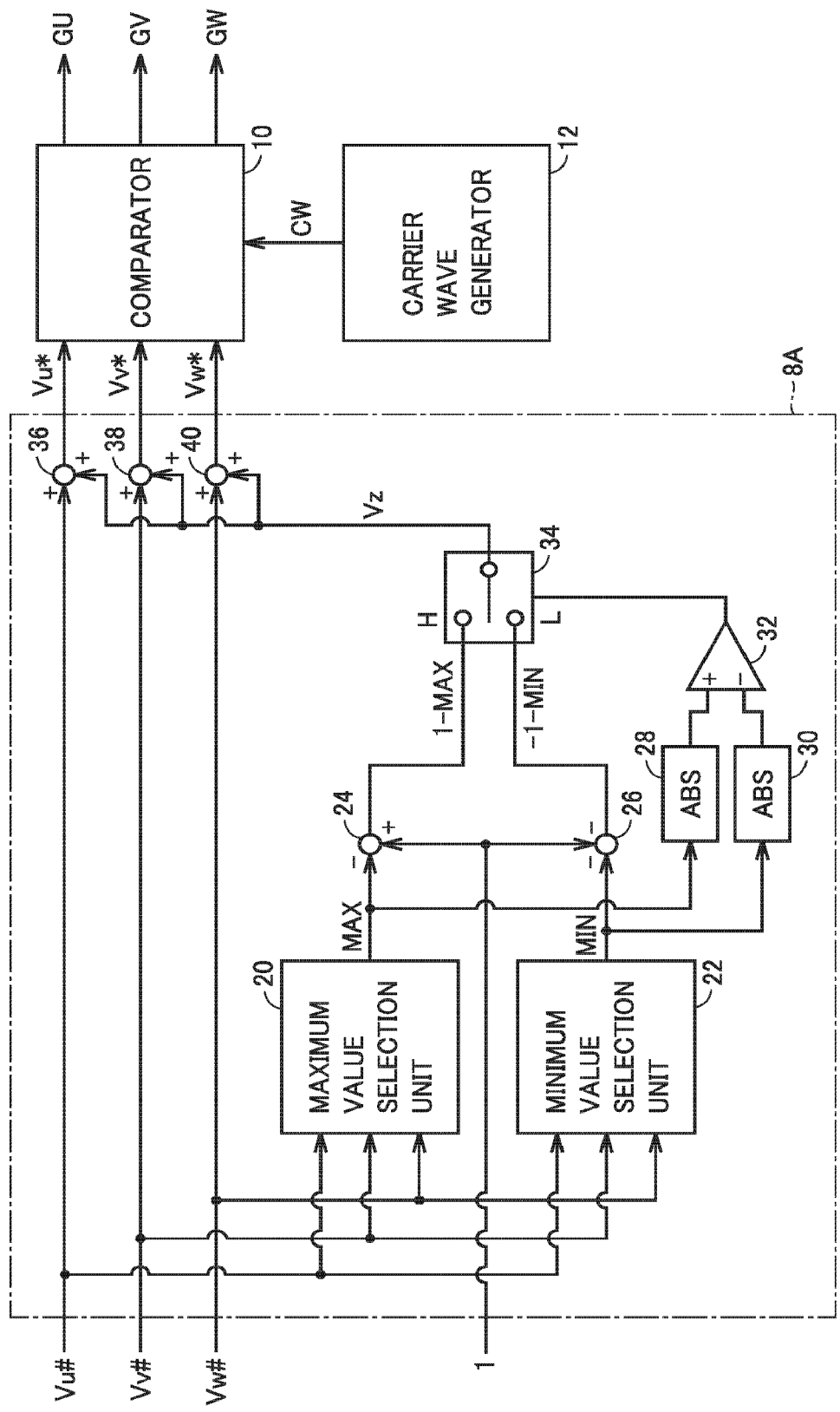
FIG. 2 is a diagram showing a configuration example of a two-phase modulation correction unit according to a comparative example.

FIG. 2 is a diagram showing a configuration example of two-phase modulation correction unit 8A according to a comparative example. Referring to FIG. 2, two-phase modulation correction unit 8A includes a maximum value selection unit 20, a minimum value selection unit 22, subtractors 24 and 26, absolute value circuits (ABS) 28 and 30, a comparator 32, a switching unit 34, and adders 36, 38, and 40.

Maximum value selection unit 20 selects a voltage command of a phase having a maximum voltage value from among sinusoidal three phase voltage commands Vu #, Vv #, and Vw #. The phase having a maximum voltage value is switched by each 120° in order of the U-phase, the V-phase and the W-phase. Maximum value selection unit 20 outputs a voltage command of the selected phase (which will be hereinafter also referred to as a "maximum voltage command MAX") to subtractor 24. Maximum value selection unit 20 corresponds to one embodiment of the "first selection unit".

Minimum value selection unit 22 selects a voltage command of a phase having a minimum voltage value from among three phase voltage commands Vu #, Vv #, and Vw #. The phase having a minimum voltage value is switched by each 120° in order of the U-phase, the V-phase and the W-phase. Minimum value selection unit 22 outputs a voltage command of the selected phase (which will be hereinafter also referred to as a "minimum voltage command MIN") to subtractor 26. Minimum value selection unit 22 corresponds to one embodiment of the "second selection unit".

In the following description, the amplitude of carrier wave CW is defined as "1". Carrier wave CW has a maximum value as 1 and a minimum value as −1. The amplitudes of three phase voltage commands Vu #, Vv # and Vw # are smaller than amplitude 1 of the carrier wave, in which case MAX<1 and −1<MIN.

Subtractor 24 subtracts maximum voltage command MAX from a maximum value 1 of carrier wave CW, and outputs a signal showing a subtraction result (1−MAX). The subtraction result (1−MAX) of subtractor 24 corresponds to a "third value". Subtractor 26 subtracts minimum voltage command MIN from a minimum value (−1) of carrier wave CW, and outputs a signal showing a subtraction result (−1−MIN). The subtraction result (−1−MIN) of subtractor 26 corresponds to a "first value".

Absolute value circuit 28 calculates an absolute value of maximum voltage command MAX, and outputs a signal showing the calculation result. Absolute value circuit 30 calculates an absolute value of minimum voltage command MIN, and outputs a signal showing the calculation result.

Comparator 32 compares the output signal from absolute value circuit 28 with the output signal from absolute value circuit 30, and outputs a signal showing a comparison result. When the output signal from absolute value circuit 28 is greater than the output signal from absolute value circuit 30, that is, in the case where the absolute value of maximum voltage command MAX>the absolute value of minimum voltage command MIN, comparator 32 outputs an H (logic high) level signal. On the other hand, when the output signal from absolute value circuit 28 is smaller than the output signal from absolute value circuit 30, that is, in the case where the absolute value of maximum voltage command MAX<the absolute value of minimum voltage command MIN, comparator 32 outputs an L (logic low) level signal.

Switching unit 34 has a first input terminal, a second input terminal, and an output terminal. The first input terminal receives an output signal (1−MAX) from subtractor 24. The second input terminal receives an output signal (−1−MIN) from subtractor 26. Based on the output signal from comparator 32, switching unit 34 selects one of two input signals and outputs the selected signal through its output terminal Specifically, when the output signal from comparator 32 is at an H level, switching unit 34 selects the output signal (1−MAX) from subtractor 24. When the output signal from comparator 32 is at an L level, switching unit 34 selects the output signal (−1−MIN) from subtractor 26.

In other words, in the case where the absolute value of maximum voltage command MAX>the absolute value of minimum voltage command MIN, the output signal (1−MAX) from subtractor 24 is selected. On the other hand, in the case where the absolute value of maximum voltage command MAX<the absolute value of minimum voltage command MIN, the output signal (−1−MIN) from subtractor 26 is selected. The signal selected by switching unit 34 forms a "zero-phase voltage command Vz".

Adder 36 adds zero-phase voltage command Vz to U-phase voltage command Vu #, thereby generating U-phase voltage command Vu* (Vu*=Vu #+Vz). Adder 38 adds zero-phase voltage command Vz to V-phase voltage command Vv #, thereby generating V-phase voltage command Vv* (Vv*=Vv #+Vz). Adder 40 adds zero-phase voltage command Vz to W-phase voltage command Vw #, thereby generating W-phase voltage command Vw* (Vw*=Vw #+Vz).

By two-phase modulation correction unit 8A, for example, when maximum voltage command MAX is U-phase voltage command Vu #, voltage commands Vu*, Vv* and Vw* of respective phases are calculated by the following equations (1), (2) and (3), respectively. It is to be noted that amplitudes of Vu #, Vv # and Vw # are defined as E (E<1).

$$Vu^* = E\sin\theta + (1 - E\sin\theta) = 1 \tag{1}$$

$$Vv^* = E\sin(\theta - 2\pi/3) + (1 - E\sin\theta) \tag{2}$$

$$Vw^* = E\sin(\theta + 2\pi/3) + (1 - E\sin\theta) \tag{3}$$

Furthermore, when minimum voltage command MIN is U-phase voltage command Vu #, voltage commands Vu*, Vv* and Vw* of respective phases are calculated by the following equations (4), (5) and (6), respectively.

$$Vu^* = E\sin\theta + (-1 - E\sin\theta) = -1 \tag{4}$$

$$Vv^* = E\sin(\theta - 2\pi/3) + (-1 - E\sin\theta) \tag{5}$$

$$Vw^* = E\sin(\theta + 2\pi/3) + (-1 - E\sin\theta) \tag{6}$$

The first term on the right side in each of the equations (1), (2) and (3) corresponds to a corresponding one of voltage commands Vu #, Vv #, and Vw # of respective phases. Also, (1−E sin θ) in the second term corresponds to zero-phase voltage command Vz. The first term on the right side in each of the equations (4), (5) and (6) corresponds to a corresponding one of voltage commands Vu #, Vv #, and Vw # of respective phases. Also, (−1−E sin θ) in the second term corresponds to zero-phase voltage command Vz.

As apparent from the equations (1) to (6), even when zero-phase voltage command Vz is added to each of voltage commands Vu*, Vv* and Vw* of respective phases, no influence is exerted upon the output line to line voltage of three-phase inverter 2. Also when V-phase voltage command Vv # and W-phase voltage command Vw # each are maximum voltage command MAX or minimum voltage command MIN, voltage commands Vu*, Vv* and Vw* of respective phases can be calculated in a similar manner.

Figure 3:
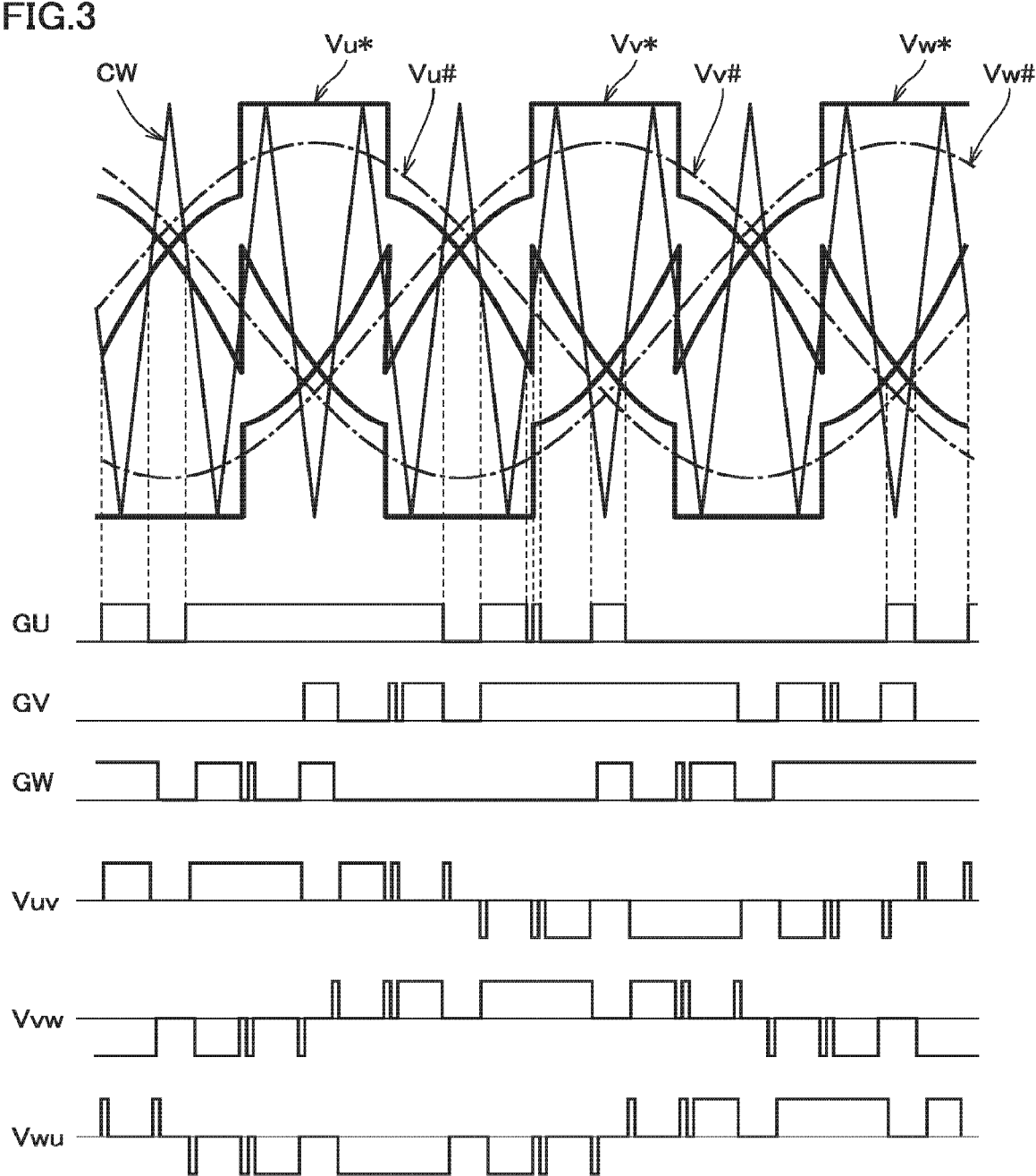
FIG. 3 is a diagram showing operation waveforms of a three-phase inverter occurring when PWM is performed while applying the two-phase modulation correction unit according to the comparative example.

FIG. 3 is a diagram showing operation waveforms of three-phase inverter 2 occurring when PWM is performed while applying two-phase modulation correction unit 8A according to the comparative example. In FIG. 3, the alternate long and short dash lines show sinusoidal three phase voltage commands Vu #, Vv #, and Vw #. Three phase voltage commands Vu*, Vv*, and Vw* are obtained by adding zero-phase voltage command Vz to each of three phase voltage commands Vu #, Vv #, and Vw #, respectively.

FIG. 3 also shows: control signals GU, GV, and GW that are generated as a result of comparing three phase voltage commands Vu*, Vv*, and Vw*, respectively, with carrier wave CW; and output line to line voltages Vuv, Vvw, and Vwu that are obtained by causing switching elements Q1, to Q6 to be turned on and off using control signals GU, GV, and GW.

At the timing when each of voltage commands Vu*, Vv* and Vw* of respective phases coincides with the amplitude of carrier wave CW, two switching elements in a corresponding one of phases (for example, switching elements Q1, Q2) are turned on and off. In order to avoid a power supply short circuit, two switching elements in each phase are controlled such that one switching element is turned on while the other switching element is turned off. The fundamental wave component of each of output line to line voltages Vuv, Vvw, and Vwu appears as a sinusoidal wave having the same frequency as that of a corresponding one of three phase voltage commands Vu #, Vv #, and Vw #.

As can be seen from FIG. 3, in a general two-phase modulation scheme, the switching elements in each phase are not switched in the time period corresponding to 120° per switching cycle. Thus, the number of switching times of the switching elements is two thirds of that in the sinusoidal wave comparison scheme. In this way, in the two-phase modulation scheme, the number of switching times is smaller than that in the sinusoidal wave comparison scheme. Thus, the switching loss occurring in three-phase inverter 2 can be reduced.

On the other hand, in the two-phase modulation scheme, however, the voltage values of voltage commands Vu*, Vv* and Vw* of respective phases abruptly change in each time period of 60°. Such discontinuity in voltage commands Vu*, Vv* and Vw* of respective phases produces distortion in the voltage waveform output from three-phase inverter 2. This waveform distortion may increase a harmonic component contained in the output voltage from three-phase inverter 2 and also may increase a zero-phase current.

Thus, the present embodiment proposes a new control configuration for suppressing waveform distortion in the output voltage from three-phase inverter 2 occurring when two-phase modulation is applied. In the following, the two-phase modulation scheme according to the present embodiment will be described with reference to FIGS. 4 and 5.

Figure 4:
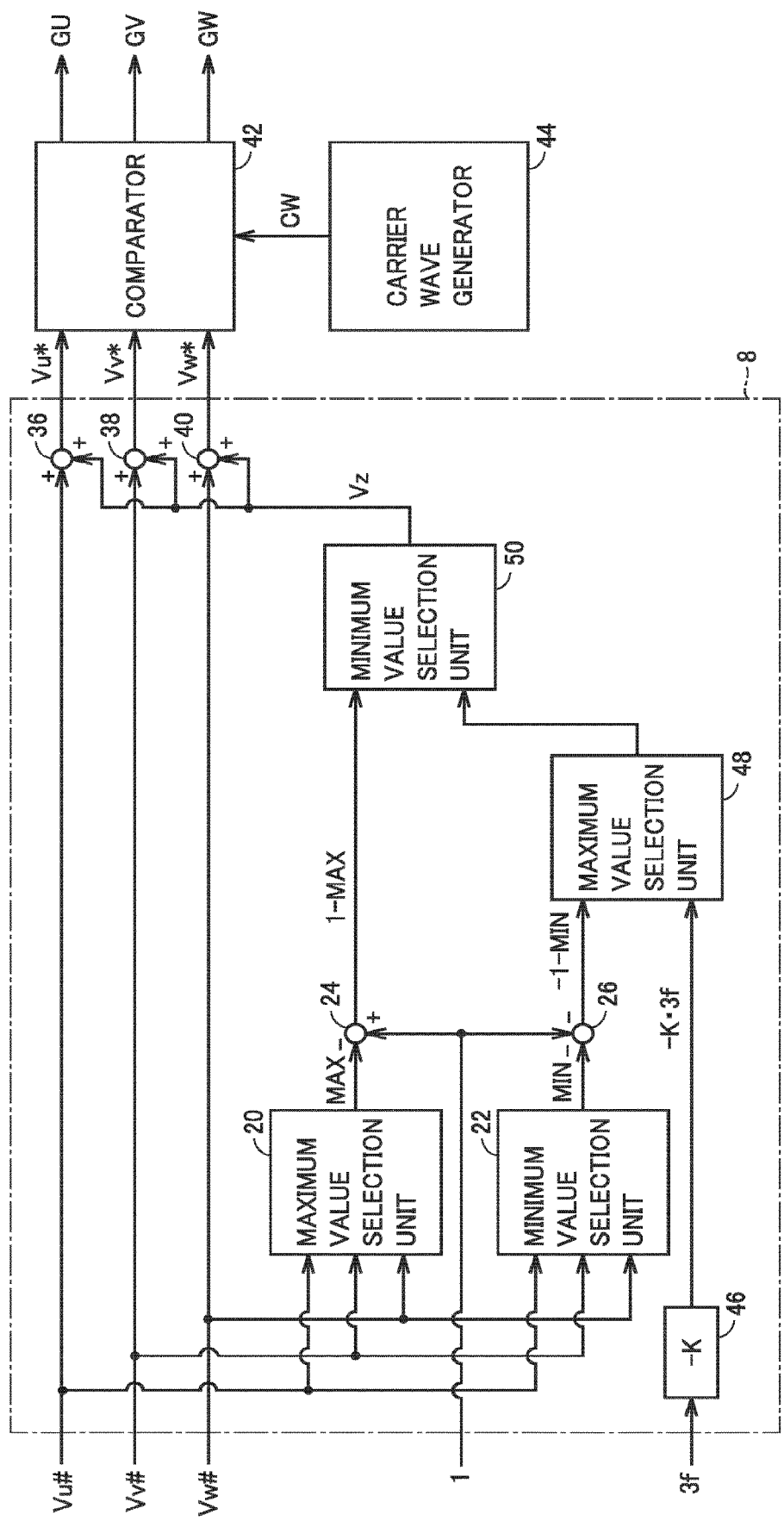
FIG. 4 is a diagram showing a configuration example of a two-phase modulation correction unit according to the present embodiment.

FIG. 4 is a diagram showing a configuration example of two-phase modulation correction unit 8 according to the present embodiment. Referring to FIG. 4, two-phase modulation correction unit 8 according to the present embodiment is different from two-phase modulation correction unit 8A according to the comparative example shown in FIG. 2 in that it includes a multiplier 46, a maximum value selection unit 48, and a minimum value selection unit 50 in place of absolute value circuits 28 and 30, comparator 32, and switching unit 34.

As will be described below, two-phase modulation correction unit 8 uses a third harmonic component 3f that is in synchronization with three phase voltage commands Vu #, Vv #, and Vw # for generating zero-phase voltage command Vz. In the specification of the present application, third harmonic component 3f is defined as sin (3θ).

Multiplier 46 multiplies third harmonic component 3f by a coefficient "−K". "K" is a coefficient for determining the amplitude of third harmonic component 3f. In the case where K=1, third harmonic component (−K·3f)=−sin(3θ), which has the same amplitude as that of carrier wave CW. When coefficient K is prefixed by a minus sign "−" and when K is positive, (−K·3f) is a signal containing third harmonic component 3f with a phase shifted by 180° (that is, a signal containing third harmonic component 3f that is inverted in the positive and negative relation). On the other hand, when K is negative, (−K·3f) is a signal that is in phase with third harmonic component 3f. The signal showing the multiplication result (−K·3f) of multiplier 46 corresponds to a "second value".

Maximum value selection unit 48 selects a signal having a larger voltage value from among the signal (the first value) showing a subtraction result (−1−MIN) of subtractor 26 and the signal (the second value) showing a third harmonic component (−K·3f) output from multiplier 46. Maximum value selection unit 48 corresponds to one embodiment of the "third selection unit".

Minimum value selection unit 50 selects a signal having a smaller voltage value from among the signal (the third value) showing a subtraction result (1−MAX) of subtractor 24 and the output signal from maximum value selection unit 48. The signal selected by minimum value selection unit 50 forms "zero-phase voltage command Vz". Minimum value selection unit 50 corresponds to one embodiment of the "fourth selection unit".

Adder 36 adds zero-phase voltage command Vz to U-phase voltage command Vu #, thereby generating U-phase voltage command Vu* (Vu*=Vu #+Vz). Adder 38 adds zero-phase voltage command Vz to V-phase voltage command Vv #, thereby generating V-phase voltage command Vv* (Vv*=Vv #+Vz). Adder 40 adds zero-phase voltage command Vz to W-phase voltage command Vw #, thereby generating W-phase voltage command Vw* (Vw*=Vw #+Vz).

In other words, voltage commands Vu*, Vv*, and Vw* of respective phases are calculated by the following equations (7), (8) and (9), respectively. It is to be noted that the amplitudes of Vu #, Vv # and Vw # are defined as E (E<1).

$$Vu^* = E \sin\theta + Vz \qquad (7)$$

$$Vv^* = E \sin(\theta - 2\pi/3) + Vz \qquad (8)$$

$$Vw^* = E \sin(\theta + 2\pi/3) + Vz \qquad (9)$$

It is to be noted that zero-phase voltage command Vz is calculated by the following equation (10).

$$Vz = \min[\max\{(-1-\text{MIN}), -K\cdot\sin(3\theta)\}, (1-\text{MAX})] \qquad (10)$$

As apparent from the equations (7) to (9), even when zero-phase voltage command Vz is added to each of voltage commands Vu*, Vv*, and Vw* of respective phases, the output line to line voltage of three-phase inverter 2 is not influenced thereby.

Figure 5:
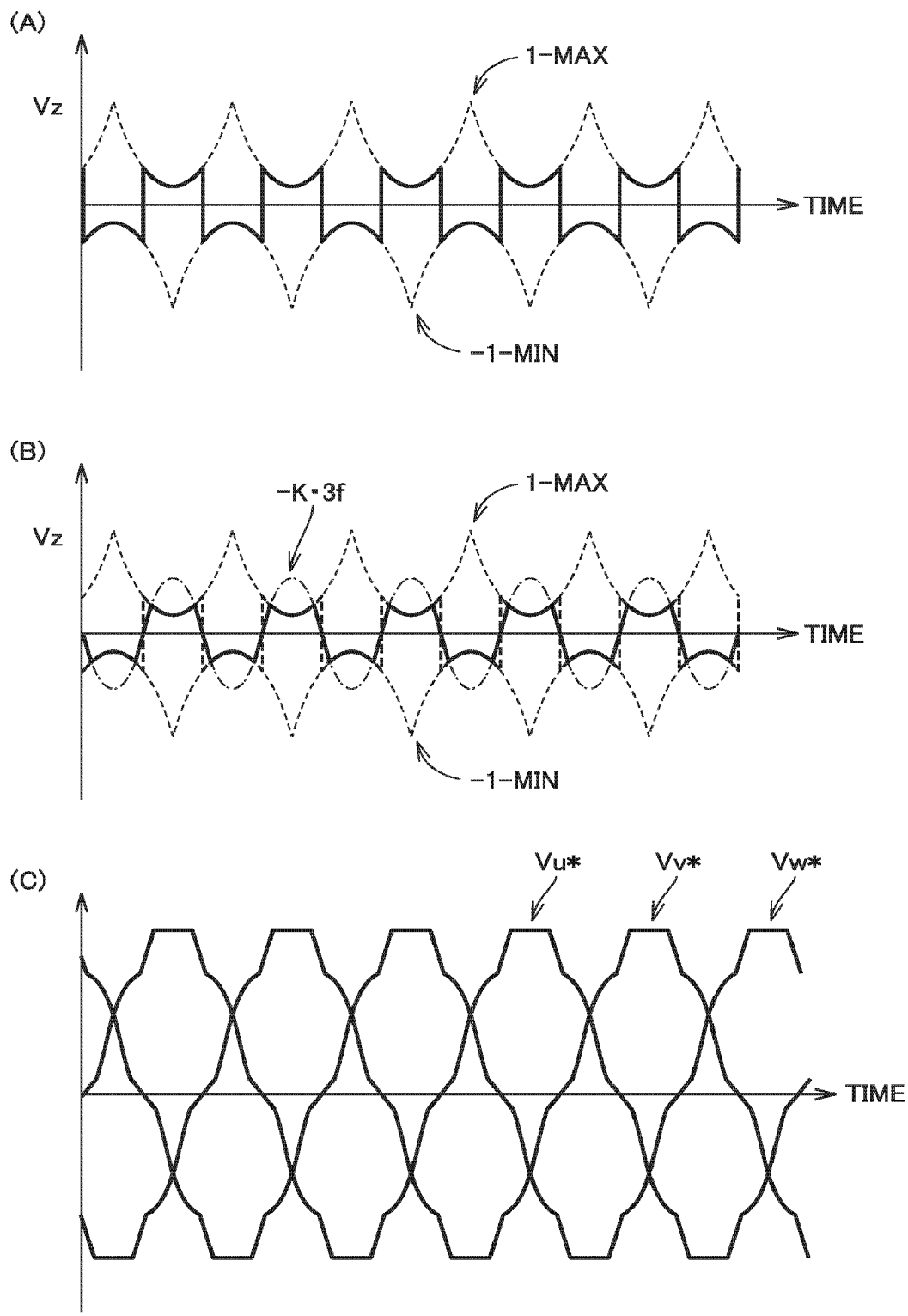
FIG. 5 is a diagram for illustrating the operation of the two-phase modulation correction unit shown in FIG. 4.

FIG. 5 is a diagram for illustrating the operation of two-phase modulation correction unit 8 shown in FIG. 4. FIG. 5(A) shows a waveform of zero-phase voltage command Vz generated by two-phase modulation correction unit 8A (see FIG. 2) according to the comparative example. The dashed lines in the figure show an output signal (1−MAX) from subtractor 24, and an output signal (−1−MIN) from subtractor 26. The solid line in the figure shows zero-phase voltage command Vz generated based on these two signals.

FIG. 5(B) shows a waveform of zero-phase voltage command Vz generated by two-phase modulation correction unit 8 (see FIG. 4) according to the present embodiment. The dashed lines in the figure show an output signal (1−MAX) from subtractor 24, and an output signal (−1−MIN) from subtractor 26. The alternate long and short dash line in the figure shows a third harmonic component (−K·3f) output from multiplier 46. FIG. 5(B) shows an example in which −K=−0.3. The solid line in the figure shows zero-phase voltage command Vz generated based on these three signals.

According to FIG. 5(A), zero-phase voltage command Vz changes sharply between the states of positive and negative in each time period of 60°. Thus, as shown in FIG. 3, voltage commands Vu* Vv*, and Vw* of respective phases are discontinuous.

In contrast, in the present embodiment, zero-phase voltage command Vz is generated based on the combination of (1−MAX), (−1−MIN) and the third harmonic component (−K·3f). In the example in FIG. 5(B), zero-phase voltage command Vz is configured such that the signal having a larger voltage value among (−1−MIN) and (−K·3f) and the signal having a smaller voltage value among (1−MAX) and (−K·3f) are switched alternately in each ½ cycle of third harmonic component 3f. Then, in this configuration, zero-phase voltage command Vz changes smoothly between the states of positive and negative in each time period of 60° under the influence of the third harmonic component (−K·3f).

FIG. 5(C) shows waveforms of voltage commands Vu*, Vv*, and Vw* of respective phases, which are generated by adding zero-phase voltage command Vz shown in FIG. 5(B) to each of voltage commands Vu #, Vv #, and Vw # of respective phases. When comparing three phase voltage commands Vu*, Vv*, and Vw* in FIG. 5(C) with three phase voltage commands Vu*, Vv* and Vw*, respectively, shown in FIG. 3, FIG. 5(C) shows that the voltage commands of two phases other than the phase having the maximum amplitude smoothly change. Thereby, the discontinuity in each of voltage commands Vu*, Vv* and Vw* of respective phases is reduced, so that the waveform distortion in the output voltage from three-phase inverter 2 can be reduced. This can consequently suppress increases in the harmonic component, which is contained in the output voltage from three-phase inverter 2, and the zero-phase current.

In this case, as shown in FIG. 4, third harmonic component 3f used for generating zero-phase voltage command Vz can be adjusted in amplitude and adjusted to be positive and negative by coefficient "−K" multiplied by third harmonic component 3f. The waveform of zero-phase voltage command Vz is changed in accordance with the amplitude of third harmonic component 3f and in accordance with whether third harmonic component 3f is positive or negative. Thereby, the waveforms of three phase voltage commands Vu*, Vv* and Vw* also change. In the following, the relation of coefficient "−K" with zero-phase voltage command Vz and three phase voltage commands Vu*, Vv*, Vw* will be described.

Figure 6:
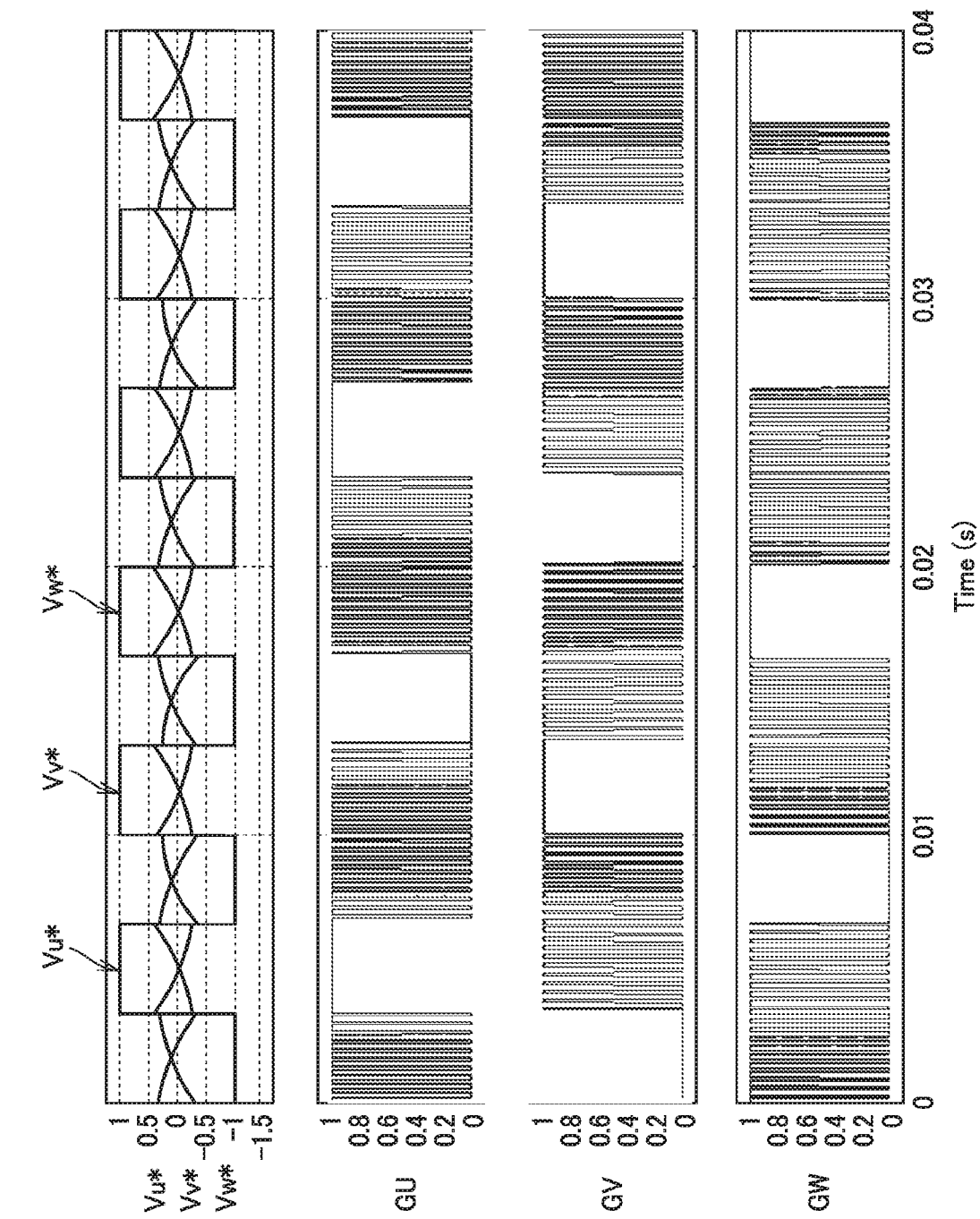
FIG. 6 shows waveform diagrams of three phase voltage commands and control signals generated by the two-phase modulation correction unit according to the comparative example.

FIG. 6 shows waveform diagrams of three phase voltage commands Vu*, Vv* and Vw* and control signals GU, GV and GW generated by two-phase modulation correction unit 8A (see FIG. 2) according to the comparative example. As shown in FIG. 6, the amplitude of each of voltage commands Vu*, Vv* and Vw* of respective phases is fixed at 1 in a time period of 120° per switching cycle. During this time period, since the control signal in the corresponding phase is fixed, two switching elements in this corresponding phase are not switched. On the other hand, two switching elements in each of the remaining two phases are turned on and off.

FIG. 7 shows signal waveform diagrams on the condition that −K=−0.3 (specifically, K=0.3) in two-phase modulation correction unit 8 (see FIG. 4) according to the present embodiment. FIG. 7(A) shows a waveform diagram of zero-phase voltage command Vz. FIG. 7(B) shows waveform diagrams of three phase voltage commands Vu*, Vv*, Vw* and control signals GU, GV, GW.

In the case where −K=−0.3, the amplitude of third harmonic component 3f is 0.3. In FIG. 7(A), the dashed lines show an output signal (1−MAX) from subtractor 24, and an output signal (−1−MIN) from subtractor 26, and the alternate long and short dash line shows a third harmonic component (−K·3f).

In FIG. 7(A), the solid line shows zero-phase voltage command Vz generated by the combination of the three signals as described above. Zero-phase voltage command Vz is configured such that the signal having a larger voltage value among (−1−MIN) and (−0.3−sin(3θ)) and the signal having a smaller voltage value among (1−MAX) and (−0.3−sin(3θ)) are alternately switched in each ½ cycle of third harmonic component 3f.

Zero-phase voltage command Vz changes continuously between the states of positive and negative under the influence of third harmonic component 3f. As a result, as shown in FIG. 7(B), three phase voltage commands Vu*, Vv*, and Vw* are reduced in discontinuity, and thus, smoothly change. By performing PWM control according to these three phase voltage commands Vu*, Vv* and Vw*, the waveform distortion in the output voltage from three-phase inverter 2 is reduced. As a result, the harmonic component, which is contained in the output voltage from three-phase inverter 2, and the zero-phase current can be reduced.

On the other hand, in FIG. 7(B), the time period in which the amplitude is fixed at one per switching cycle is shorter than that in FIG. 6. Accordingly, the number of switching times is increased, with the result that the switching loss in three-phase inverter 2 is increased.

Figure 8:
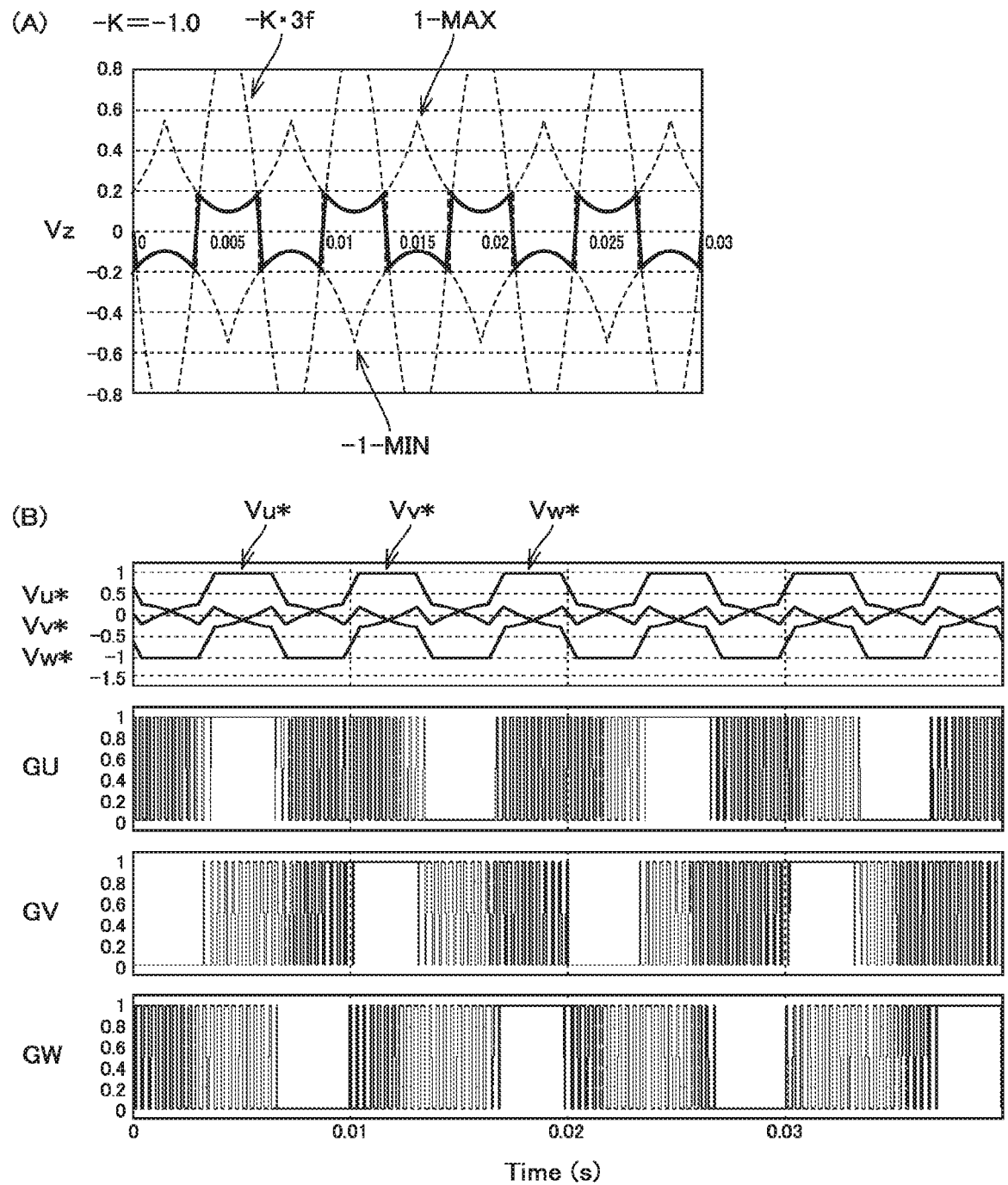
FIG. 8 shows signal waveform diagrams on the condition that −K=−1.0 in the two-phase modulation correction unit according to the present embodiment.

FIG. 8 shows signal waveform diagrams on the condition that −K=−1.0 (that is, K=1.0) in two-phase modulation correction unit 8 (see FIG. 4) according to the present embodiment. FIG. 8(A) shows a waveform diagram of zero-phase voltage command Vz. FIG. 8(B) shows waveform diagrams of three phase voltage commands Vu*, Vv*, Vw* and control signals GU, GV, GW.

In the case where −K=−1.0, the amplitude of third harmonic component 3f is 1.0. In FIG. 8(A), the dashed lines show an output signal (1−MAX) from subtractor 24 and an output signal (−1−MIN) from subtractor 26, and the alternate long and short dash line shows a third harmonic component (−K·3f).

In FIG. 8(A), the solid line shows zero-phase voltage command Vz generated by the combination of the three signals as described above. In similar manner to FIG. 7(A), zero-phase voltage command Vz is configured such that the signal having a larger voltage value among (−1−MIN) and (−1.0−sin(3θ)) and the signal having a smaller voltage value among (1−MAX) and (−1.0−sin(3θ)) are alternately switched in each ½ cycle of third harmonic component 3f.

However, in FIG. 8(A), as K is increased, the amplitude of third harmonic component 3f is increased. Accordingly, third harmonic component 3f sharply changes, with the result that zero-phase voltage command Vz also changes sharply between the states of positive and negative. In other words, as the value of K is increased (the amplitude of the third harmonic component is increased), contribution of the third harmonic component to zero-phase voltage command Vz is reduced. Thus, zero-phase voltage command Vz is approximated to zero-phase voltage command Vz in the general two-phase modulation scheme (see FIG. 5(A)).

Consequently, as shown in FIG. 8(B), three phase voltage commands Vu*, Vv* and Vw* each show discontinuity and are approximated to the waveforms of three phase voltage commands Vu*, Vv* and Vw*, respectively, shown in FIG. 6. Thereby, as compared with the case where −K=−0.3 (see FIG. 7), waveform distortion occurs in the output voltage of three-phase inverter 2. Thus, the harmonic component, which is contained in the output voltage, and the zero-phase current may increase. On the other hand, as compared with the case where −K=−0.3, the time period in which the amplitude is fixed at one per switching cycle is increased, so that the number of switching times is reduced. Therefore, the switching loss in three-phase inverter 2 can be reduced.

FIG. 9 shows signal waveform diagrams on the condition that −K=−0.15 (that is, K=0.15) in two-phase modulation correction unit 8 (see FIG. 4) according to the present embodiment. FIG. 9(A) shows a waveform diagram of zero-phase voltage command Vz. FIG. 9(B) shows waveform diagrams of three phase voltage commands Vu*, Vv*, Vw* and control signals GU, GV, GW.

In the case where −K=−0.15, the amplitude of third harmonic component 3f is 0.15. In FIG. 9(A), the dashed lines show an output signal (1−MAX) from subtractor 24, and an output signal (−1−MIN) from subtractor 26, and the alternate long and short dash line shows a third harmonic component (−K·3f).

In FIG. 9(A), the solid line shows zero-phase voltage command Vz generated by the combination of the three signals as described above. In similar manner to FIG. 7(A), zero-phase voltage command Vz is configured such that the signal having a larger voltage value among (−1−MIN) and (−0.15−sin(3θ)) and the signal having a smaller voltage value among (1−MAX) and (−0.15−sin(3θ)) are alternately switched in each ½ cycle of third harmonic component 3f.

However, in FIG. 9(A), as the value of K is reduced, the amplitude of the third harmonic component (−K·3f) is reduced. Accordingly, contribution of the third harmonic component to zero-phase voltage command Vz is increased.

Consequently, as shown in FIG. 9(B), three phase voltage commands Vu*, Vv*, and Vw* each has a reduced time period in which the amplitude is fixed at one per switching cycle, and each show a waveform that is approximated to a sinusoidal wave. Thereby, as compared with the case where −K=−0.3 (see FIG. 7), the waveform distortion in the output voltage from three-phase inverter 2 is suppressed, so that the harmonic component, which is contained in the output voltage, and the zero-phase current can be further reduced. On the other hand, as compared with the case where −K=−0.3, the number of switching times is increased, so that the switching loss in three-phase inverter 2 is increased.

In this way, as the value of K is brought closer to zero, the PWM control of three-phase inverter 2 is shifted from the two-phase modulation scheme to the sinusoidal wave comparison scheme. In the case where K=0, zero-phase voltage command Vz=0. Accordingly, three phase voltage commands Vu*, Vv*, and Vw* are substantially the same as three phase voltage commands Vu #, Vv #, and Vw #. Therefore, three-phase inverter 2 is to be PWM-controlled in the sinusoidal wave comparison scheme.

FIG. 10 shows signal waveform diagrams on the condition that −K=+0.15 (that is, K=−0.15) in two-phase modulation correction unit 8 (see FIG. 4) according to the present embodiment. FIG. 10(A) shows a waveform diagram of zero-phase voltage command Vz. FIG. 10(B) shows waveform diagrams of three phase voltage commands Vu*, Vv*, Vw* and control signals GU, GV, GW.

In the case where −K=+0.15, the amplitude of third harmonic component 3f is 0.15. In FIG. 10(A), the dashed lines show an output signal (1−MAX) from subtractor 24, and an output signal (−1−MIN) from subtractor 26, and the alternate long and short dash line shows a third harmonic component (−K·3f).

In FIG. 10(A), the solid line shows zero-phase voltage command Vz generated by the combination of the three signals as described above. As compared with the case where −K=−0.15 (see FIG. 9), the positive and negative relation of the third harmonic component (−K·3f) is inverted. In the example in FIG. 10(A), (+0.15·3f) does not cross each of (1−MAX) and (−1−MIN). Therefore, zero-phase voltage command Vz is formed only of the third harmonic component (+0.15−sin(3θ)).

Consequently, as shown in FIG. 10(B), three phase voltage commands Vu*, Vv*, and Vw* are obtained by superimposing the third harmonic component (+0.15−sin(3θ)) on each of voltage commands Vu*, Vv*, and Vw* of respective phases. Since the amplitudes of voltage commands Vu*, Vv*, and Vw* of respective phases are smaller than amplitude 1 of carrier wave CW, PWM is performed in the whole period. Since the third harmonic component does not influence the output line to line voltage of three-phase inverter 2, the fundamental wave amplitude of the line to line voltage is increased, so that the voltage utilization ratio can be improved. However, in contrast to the cases in FIGS. 7 and 8, the three-phase switching elements are operated to be on and off at all times, so that the switching loss in three-phase inverter 2 is increased.

As described above, as the third harmonic component is adjusted in amplitude and adjusted to be positive and negative by the coefficient "−K" multiplied by third harmonic component 3f, third harmonic component 3f contained in zero-phase voltage command Vz can be changed. In the above-described example, when coefficient "−K" is changed from −0.3 to −1.0 to increase the amplitude of third harmonic component 3f, zero-phase voltage command Vz is approximated to the zero-phase voltage command in the general two-phase modulation scheme. Therefore, although the harmonic component in the output voltage from three-phase inverter 2 and the zero-phase current are increased, there is still an advantage that the switching loss occurring in three-phase inverter 2 can be reduced.

In contrast, when coefficient "−K" is changed from −0.3 to −0.15 to reduce the amplitude of third harmonic component 3f, contribution of the third harmonic component (−K·3f) to zero-phase voltage command Vz is increased. Thereby, three phase voltage commands Vu*, Vv*, and Vw* each are approximated to a sinusoidal wave. Accordingly, although the switching loss in three-phase inverter 2 is increased, there is still an advantage that the harmonic component in the output voltage from three-phase inverter 2 and the zero-phase current can be suppressed. As the value of K is further brought closer to zero, a more approximated PWM control in the sinusoidal wave comparison scheme can be achieved. In the case where K=0, the PWM control in the sinusoidal wave comparison scheme is performed.

Furthermore, when coefficient "−K" is inverted to be positive or negative, three-phase inverter 2 is to be PWM-controlled based on the result obtained by superimposing third harmonic component 3f on each of three phase voltage commands Vu #, Vv #, and Vw #. This brings about an advantage that the voltage utilization ratio can be improved.

In this way, according to the power conversion device in the present embodiment, coefficient "−K" multiplied by third harmonic component 3f is adjusted in magnitude and also adjusted to be positive or negative, thereby allowing switching among: the first mode in which three-phase inverter 2 is PWM-controlled in the two-phase modulation scheme (for example, see FIG. 8); the second mode in which three-phase inverter 2 is PWM-controlled using the two-phase modulation scheme and the third harmonic component (for example, see FIGS. 7 and 9); the third mode in which three-phase inverter 2 is PWM-controlled in the sinusoidal wave comparison scheme based on three phase voltage commands Vu #, Vv #, and Vw # (for example, in the case where K=0); and the fourth mode in which three-phase inverter 2 is PWM-controlled based on three phase voltage commands Vu #, Vv #, and Vw #, each of three phase voltage commands Vu #, Vv #, and Vw #, third harmonic component 3f being superimposed on each of three phase voltage commands Vu #, Vv #, and Vw # (for example, see FIG. 10).

Thereby, as a result of comparing advantages and disadvantages among the first mode to the fourth mode, one of the first mode to the fourth mode can be selected in accordance with the advantage to be prioritized. Specifically, when reduction of the switching loss in three-phase inverter 2 needs to be prioritized, the first mode can be selected. When reduction of the harmonic component, which is contained in the output voltage, and the zero-phase current need to be prioritized, the second mode or the third mode can be selected. Furthermore, when improvement in the voltage utilization ratio needs to be prioritized, the fourth mode can be selected. For example, controller 5 can select one of the first mode to the fourth mode based on the magnitude of the output voltage and/or the current passing through three-phase inverter 2.

For example, the following is an explanation about the case where the power conversion device according to the present embodiment is applied to an uninterruptible power supply device. In the uninterruptible power supply device, generally, the distortion factor of the output voltage is defined so as not to exceed a prescribed threshold value as specifications of the output voltage from the three-phase inverter in the range in which the output power is equal to or less than the rated load. On the other hand, the above-mentioned specifications are not compensated in the range in which the output power becomes an overload. Thus, when the output power is equal to or less than the rated load, the third mode or the fourth mode is selected, so that the distortion factor of the output voltage can be prioritized. On the other hand, when the output power becomes an overload, the first mode or the second mode is selected, so that reduction of the power loss in three-phase inverter 2 can be prioritized.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1 DC power supply, 2 three-phase inverter, 3U U-phase arm, 3V V-phase arm, 3W W-phase arm, 5 controller, 6 voltage command generator, 8, 8A two-phase modulation correction unit, 10, 32 comparator, 12 carrier wave generator, 20, 48 maximum value selection unit, 22, 50 minimum value selection unit, 24, 26 subtractor, 28, 30 absolute value circuit, 34 switching unit, 36, 38, 40 adder, 46 multiplier, CW carrier wave, Q1 to Q6 switching element, D1 to D6 diode, T1, T2 DC terminal, T3 to T5 AC terminal, PL1 DC positive bus, NL1 DC negative bus, Vu #, Vv #, Vw # three phase voltage commands, Vu*, Vv*, Vw* three phase voltage commands (after correction), Vz zero-phase voltage command.

The invention claimed is:

1. A power conversion device configured to perform power conversion between DC power and three-phase AC power, the power conversion device comprising:
   a three-phase inverter having a plurality of switching elements; and
   a controller that generates PWM signals to control the three-phase inverter based on three phase voltage commands wherein,
   the controller:
       generates a zero-phase voltage command using a two-phase modulation scheme and a third harmonic component of the three phase voltage commands, based on a combination of a zero-phase voltage obtained by the two-phase modulation scheme and the third harmonic component,
       adds the generated zero-phase voltage command to each of the three phase voltage commands to correct each of the three phase voltage commands, and
       compares each of the corrected three phase voltage commands with a carrier wave to generate a control signal for controlling switching of the plurality of switching elements; wherein
   the controller includes:
       a first selection unit that selects, as a maximum voltage command, a voltage command of a phase having a maximum voltage value from among the three phase voltage commands,
       a second selection unit that selects, as a minimum voltage command, a voltage command of a phase having a minimum voltage value from among the three phase voltage commands, and
       a third selection unit that selects a maximum value from among: a first value obtained by subtracting the minimum voltage command from a minimum value of the carrier wave; and a second value obtained by multiplying the third harmonic component by a coefficient.

2. The power conversion device according to claim 1, wherein
   the controller further includes:
       a fourth selection unit that selects a minimum value from among: a selection result of the third selection unit; and a third value obtained by subtracting the maximum voltage command from a maximum value of the carrier wave, and
   the controller generates the zero-phase voltage command based on a selection result of the fourth selection unit.

3. The power conversion device according to claim 2, wherein the controller adjusts a magnitude of the coefficient and adjusts the coefficient to be positive or negative.

4. The power conversion device according to claim 2, wherein
   the controller adjusts a magnitude of the coefficient and adjusts the coefficient to be positive or negative, to perform switching among:

a first mode in which the three-phase inverter is controlled with the PWM signals using the two-phase modulation scheme, a second mode in which the three-phase inverter is PWM-controlled using the two-phase modulation scheme and the third harmonic component, a third mode in which the three-phase inverter is controlled with the PWM signals using a sinusoidal wave comparison scheme based on the three phase voltage commands, and a fourth mode in which the three-phase inverter is PWM-controlled based on the three phase voltage commands, the third harmonic component being superimposed on each of the three phase voltage commands.

* * * * *